United States Patent [19]
Matsui et al.

[11] Patent Number: 5,502,415
[45] Date of Patent: Mar. 26, 1996

[54] BOOSTER POWER GENERATING CIRCUIT

[75] Inventors: Katsuaki Matsui; Sampei Miyamoto; Hidekazu Kikuchi, all of Tokyo, Japan

[73] Assignee: Oki Electric Industry Co., Ltd., Tokyo, Japan

[21] Appl. No.: 256,228

[22] PCT Filed: Nov. 17, 1993

[86] PCT No.: PCT/JP93/01683

§ 371 Date: Jun. 29, 1994

§ 102(e) Date: Jun. 29, 1994

[87] PCT Pub. No.: WO94/11943

PCT Pub. Date: May 26, 1994

[30] Foreign Application Priority Data

Nov. 18, 1992 [JP] Japan .................................. 4-308555
Mar. 16, 1993 [JP] Japan .................................. 5-055498

[51] Int. Cl.$^6$ ...................................... G05F 1/10
[52] U.S. Cl. ........................... 327/536; 327/537; 327/589
[58] Field of Search ........................... 327/337, 536, 327/537, 589, 534, 333, 535, 543

[56] References Cited

U.S. PATENT DOCUMENTS 5,126,590  6/1992  Chern .................................. 327/536
5,172,013  12/1992  Matsumura .............................. 327/536
5,266,842  11/1993  Park .................................. 327/537

FOREIGN PATENT DOCUMENTS 4-192456A  7/1992  Japan .
4-188665A  7/1992  Japan .
2244392  11/1991  United Kingdom .

Primary Examiner—Timothy P. Callahan
Assistant Examiner—Jung Ho Kim
Attorney, Agent, or Firm—Spencer & Frank

[57] ABSTRACT

A booster power generating circuit according to the present invention comprises first to fourth booster circuits for supplying first to fourth booster potentials to first to fourth nodes in response to first to fourth pulse signals, a first precharge circuit for precharging the first node when controlled by the fourth booster potential from the fourth node, a second precharge circuit for precharging the third node when controlled by the second booster potential from the second node and a first output circuit for outputting the first booster potential of the first node to an output node, whereby a given booster potential can be output since there is no voltage drop of the boosted potential of the second and fourth nodes, there is obtained high potential between the first and third precharge circuits and the precharging speed of the first and third node is not slowed.

5 Claims, 8 Drawing Sheets

BOOSTER POWER GENERATING CIRCUIT

TECHNICAL FIELD

The present invention relates to a booster power generating circuit of a semiconductor, particularly to a booster power generating circuit for generating a given booster potential.

BACKGROUND OF THE INVENTION

A known booster power generating circuit is exemplified in FIG. 2. A circuit arrangement of this booster power generating circuit will be described with reference to FIG. 2.

The booster power generating circuit comprises a signal generating circuit 1 for generating complementary first and second pulse signals S1 and S2 and a charge pump circuit 10 for transferring a given booster potential to the load from an output node N3 in response to the first and second pulse signals S1 and S2.

The charge pump circuit 10 comprises first and second inverters 11-1 and 11-2, first and second capacitors 12-1 and 12-2, first to fourth N-channel MOSFETs (hereinafter referred to as NMOS) 13-1, 13-2, 13-3 and 13-4 and first and second P-channel MOSFETs (hereinafter referred to as PMOS) 14-1 and 14-2.

The first and second inverters 11-1 and 11-2 drive respectively the first and second pulse signals S1 and S2 which are output from the signal generating circuit 1, thereby outputting third and fourth pulse signals S3 and S4. The first capacitor 12-1 is connected to the output side of the first inverter 11-1 for boosting the potential of first node N1 in response to the third pulse signal S3. The second capacitor 12-2 is connected to the output side of the second inverter 11-2 for boosting the potential of second node N2 in response to the fourth pulse signal S4. The first node N1 is connected to each source of the first and second NMOSs 13-1 and 13-2 which precharge the first node N1 and also connected to the drain of the first PMOS 14-1 which transfers the potential of the first node N1 to the output node N3. The first NMOS 13-1 is connected to a power potential Vcc at its drain and also connected to the second node N2 at its gate. The second NMOS 13-2 is connected to the power potential Vcc at its drain and gate. The second node N2 is connected to each source of the third and fourth NMOSs 13-3 and 13-4 which precharge the second node N2 and also connected to the drain of the second PMOS 14-2 for transferring the potential of the second node N2 to the output node N3. The third NMOS 13-3 is connected to the power potential Vcc at its drain and also connected to the first node N1 at its gate. The fourth NMOS 13-4 is connected to the power potential Vcc at its drain and gate.

The charge pump circuit 10 is set under the following circuit condition.

Supposing a threshold potential of each of the first to fourth NMOSs 13-1 to 13-4 are represented as vtn and a threshold potential of each of the first and second PMOSs 14-1 and 14-2 are represented as vtp. Potential $\phi p$ of the load, to be connected to the output node N3, depending on charge consumption I is represented as $\phi p=2Vcc-vtp$ in case of I=0 while it is represented as $\phi p=2Vcc-vtp-\alpha$ in case of I=0. Supposing that capacitance of each of the first and second capacitors 12-1 and 12-2 is represented as Cp, parasitic capacitance of each of the first and second nodes N1 and N2 is represented as Cs, potential change of each of the third and fourth pulse signals S3 and S4 is represented as $\delta V$ and potential change of each of the first and second nodes N1 and N2 is represented as $\delta N$, the following equation is established.

$$\delta N = \frac{Cp}{Cp+Cs} * \delta V$$

where, Cp>>Cs and $\delta N = \delta V$

SUMMARY OF THE INVENTION

A booster power generating circuit according to a first aspect of the invention comprises first to fourth booster circuits for supplying first to fourth booster potentials to first to fourth nodes in response to first to fourth pulse signals, a first precharge circuit for precharging the first node upon reception of the fourth booster potential from the fourth node, a second precharge circuit for precharging the third node upon reception of the second booster potential from the second node and a first output circuit for outputting the first booster potential of the first node to an output node.

A booster power generating circuit according to a second aspect of the invention comprises a first booster circuit provided with a first capacitor having first capacitance for supplying a first booster potential to a first node in response to a first pulse signal, a second booster circuit provided with a capacitor having second capacitance which is smaller than the first capacitance for supplying a second booster potential to a second node in response to a second pulse signal, a third booster circuit provided with a third capacitor having third capacitance for supplying a third booster potential to a third node in response to a third pulse signal, and a fourth booster circuit provided with a fourth capacitor having fourth capacitance which is smaller than the third capacitance for supplying a fourth booster potential to a fourth node in response to a fourth pulse signal.

A booster power generating circuit according to a third aspect of the invention comprises a first switching circuit for outputting a first booster potential of a first node to an output node upon reception of a fifth booster potential from a fifth node and a second switching circuit for outputting a second booster potential of a second node to the output node upon reception of a sixth booster potential from a sixth node.

A booster power generating circuit according to a fourth aspect of the invention comprises a first precharge circuit for precharging a first node upon reception of a fourth booster potential from a fourth node, a second precharge circuit for precharging a third node upon reception of a second booster potential from a second node, a first output circuit for outputting second and fourth booster potentials of second and fourth nodes and a second output circuit for outputting first and third booster potentials of first and third nodes.

BEST MODE FOR CARRYING OUT THE INVENTION

Figure 1:
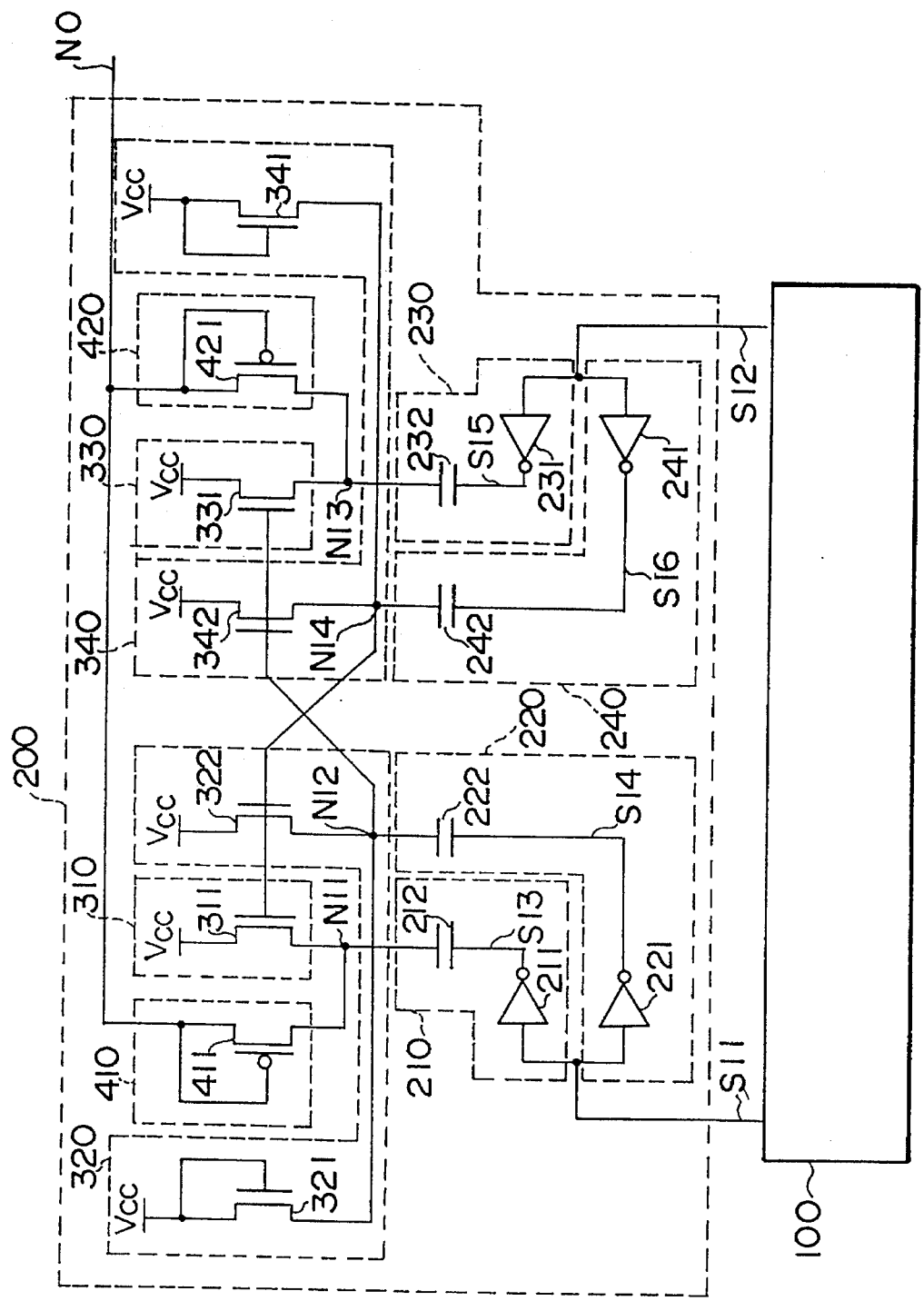
FIG. 1 is a circuit diagram of a booster power generating circuit according to a first embodiment of the present invention.
Figure 2:
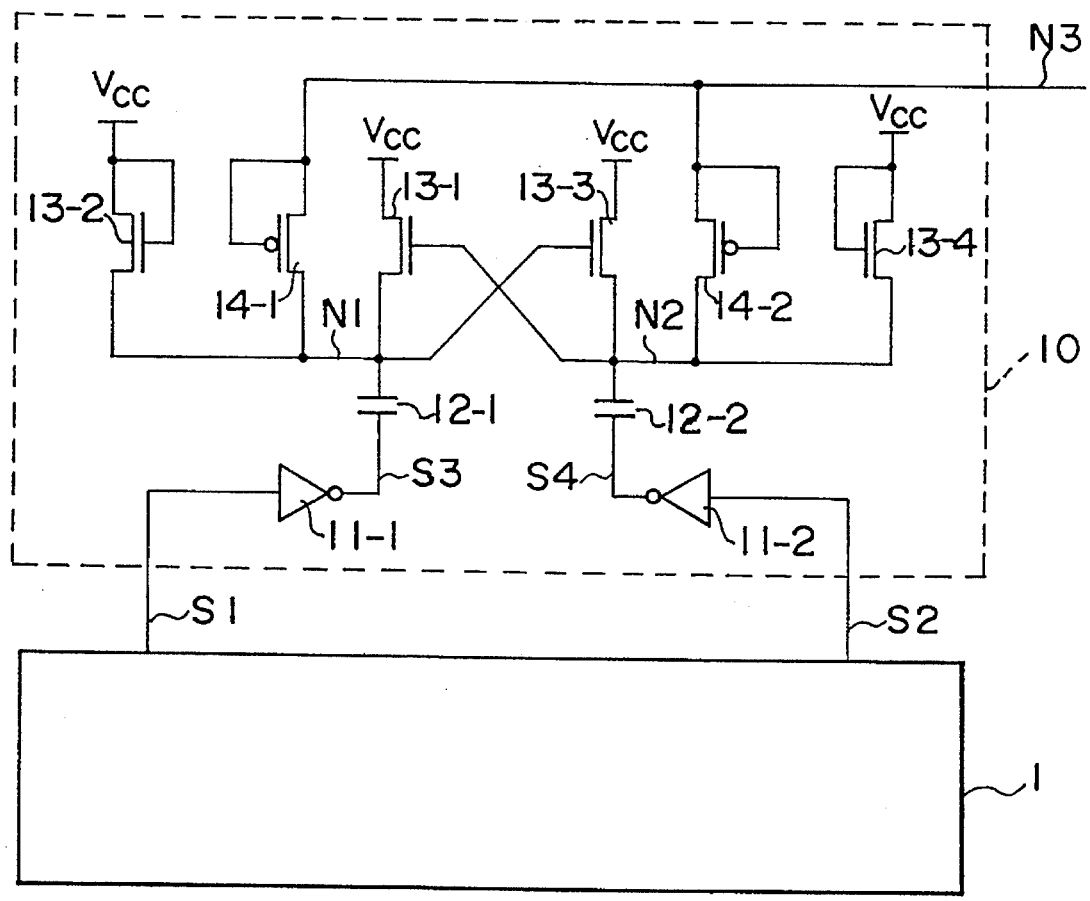
FIG. 2 is a circuit diagram of a conventional booster power generating circuit.

FIG. 1 is a circuit diagram of a booster power generating circuit according to a first embodiment of the present invention. The arrangement of the booster power generating circuit of the first embodiment will be described with reference to FIGS. 1, 3 and 4.

The booster power generating circuit comprises a signal generating circuit 100 for outputting complementary first and second pulse signals S11 and S12 and a charge pump circuit 200 for generating a given booster potential in response to the first and second pulse signals S11 and S12 and outputting the thus generated booster potential to the load connected to an output node NO.

The charge pump circuit 200 comprises first, second, third and fourth booster circuits 210, 220, 230, and 240 for boosting potentials of first, second, third and fourth nodes N11, N12, N13 and N14 in response to the first and second pulse signals S11 and S12, first, second, third and fourth precharge circuits 310, 320, 330 and 340 for precharging the first, second, third and fourth nodes N11, N12, N13 and N14 and first and second output circuits 410 and 420 for outputting the boosted potentials of the first and third nodes N11 and N13 to the output node NO.

The first booster circuit 210 has an inverter 211 for driving the first pulse signal S11 output from the signal generating circuit 100 to thereby output a third pulse signal S13. An output side of the inverter 211 is connected to the first node N11 by way of a first capacitor 212 which boosts the potential of the first node N11 in response to the third pulse signal S13.

The second booster circuit 220 has an inverter 221 for driving the first pulse signal S11 in the same manner as the first booster circuit 210 for outputting a fourth pulse signal S14. An output side of the inverter 221 is connected to the second node N12 by way of a second capacitor 222 which boosts the potential of the second node N12 in response to the fourth pulse signal S14.

The third booster circuit 230 has an inverter 231 for driving the second pulse signal S12 to thereby output a fifth pulse signal S15. An output side of the inverter 231 is connected to a third node N13 by way of a third capacitor 232 which boosts the potential of the third node N13 in response to the fifth pulse signal S15.

The fourth booster circuit 240 has an inverter 241 for driving the second pulse signal S12 in the same manner as the third booster circuit 230 for outputting a sixth pulse signal S16. An output side of the inverter 241 is connected to the fourth node N14 in response to the sixth pulse signal S16.

The first precharge circuits 310 comprises an NMOS 311 gate of which is controlled by the potential of the fourth node N14. The NMOS 311 is connected to the first node N11 at its source and also connected to a power potential Vcc at its drain.

The second precharge circuit 320 comprises an NMOS 321 for precharging the second node N12 and an NMOS 322 gate of which is controlled by the fourth node N14. Sources of each of the NMOSs 321 and 322 are respectively connected to the second node N12 and the gate and drain of the NMOS 321 are connected to the power potential Vcc while the drain of the NMOS 322 is connected to the power potential Vcc.

The third precharge circuits 330 comprises an NMOS 331 gate of which is controlled by the potential of the fourth node N12. The NMOS 331 is connected to the third node N13 at its source and also connected to a power potential Vcc at its drain.

The fourth precharge circuit 340 comprises an NMOS 341 for precharging the fourth node N14 and an NMOS 342 gate of which is controlled by the second node N12. Sources of each of the NMOSs 341 and 342 are respectively connected to the fourth node N14 and the NMOS 341 is connected to the power potential Vcc at its gate and drain while the NMOS 342 is connected to the power potential Vcc at its drain.

The first output circuit 410 comprises a PMOS 411 for outputting the boosted potential of the first node N11 to the output node NO. The PMOS 411 is connected to the output node NO at its source and gate and also connected to the first node N11 at its drain.

The second circuit 420 comprises a PMOS 421 for outputting the boosted potential of the third node N13 to the output node NO in the same manner as the first output circuit 410. The PMOS 421 is connected to the output node NO at its source and gate and also connected to the third node N13 at its drain.

Figure 3:
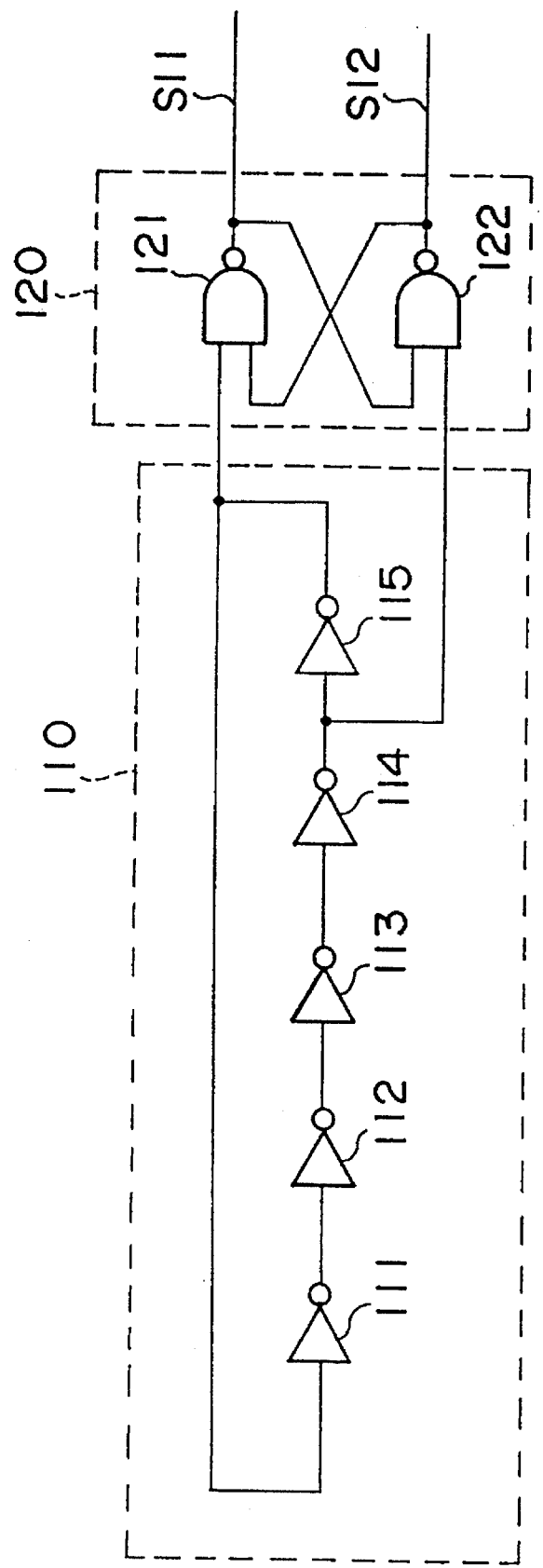
FIG. 3 is a circuit diagram of a signal generating circuit in the booster power generating circuit in FIG. 1.

FIG. 3 is a circuit diagram of a signal generating circuit in the booster power generating circuit in FIG. 1.

The signal generating circuit comprises a ring oscillator 110 and a flip-flop circuit (hereinafter referred to as FF) 120 connected to the output side of the ring oscillator 110 for outputting the first and second pulse signals S11 and S12.

The ring oscillator 110 comprises a plurality of odd numbers of inverters 111 to 115 which are connected to one another in a ring-like arrangement wherein the inverter 115 is connected at is input and output sides to the FF 120. The FF 120 comprises two 2-input NAND gates 121 and 122 which are connected to each other in a cross-linking manner. One input side of the NAND gate 121 is connected to the output side of the inverter 115 of the ting oscillator 110 while the other input side thereof is connected to the output side of the NAND gate 122. One input side of the NAND gate 122 is connected to the output side of the inverter 114 of the ring oscillator 110 while the other input side thereof is connected to the output side of the NAND gate 121.

Complementary signals are output from the ring oscillator 110 of the signal generating circuit 100 when the signal generating circuit 100 oscillates. The FF 120 is set or reset in response to the signals issued by the ring oscillator 110 to thereby output the complementary first and second pulse signals S11 and S12 in a given timing.

Figure 4:
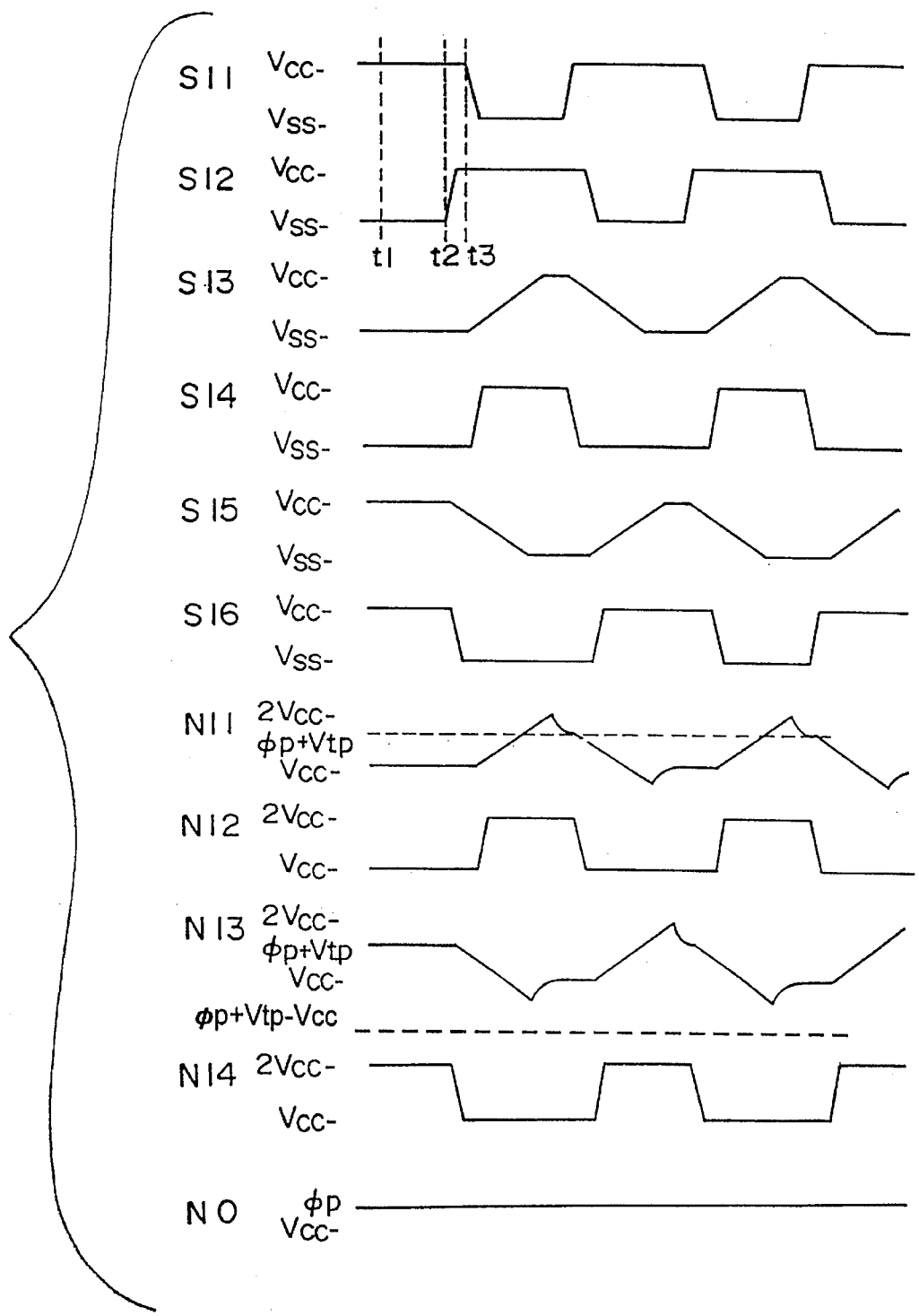
FIG. 4 is a timing chart explaining the operation of the booster power generating circuit in FIG. 1.

FIG. 4 is a timing chart explaining the operation of the booster power generating circuit in FIG. 1.

Supposing that each threshold potential of the NMOSs 311, 321, 322, 331, 341 and 342 is vtn and each threshold potential of the PMOSs 411 and 421 is vtp.

At time t1, the pulse signals S11, S15 and S16 are in the power potential Vcc and the pulse signals S12, S13 and S14 are in the ground potential Vss while the nodes N11 and N12 are in the power potential Vcc, the node N13 is in the potential expressed by $\phi p + vtp$, the node N14 is in the doubled power potential Vcc, i.e., 2Vcc and the node NO is in the output potential φp.

At time t2, if the second pulse signal S12 is changed from the ground potential Vss to the power potential Vcc, the pulse signals S15 and S16 which are driven by the inverters 231 and 241 are changed from the power potential Vcc to the ground potential Vss. The potential of the node N13 is changed to the potential expressed by φp+vtp−Vcc by the third capacitor 232 when the latter receives the pulse signal S15. The potential of the node N14 is changed to the power potential Vcc by the capacitor 242 when the latter receives the pulse signal S16. At this time, when the potential of the node N13 becomes less than the potential expressed by Vcc−vtn, the NMOS 331 is turned on so that the potential of the node N13 is charged until it reaches the potential expressed by Vcc−vtn.

At time t3, if the first pulse signal S11 is changed from the power potential Vcc to the ground potential Vss, the third and fourth pulse signals S13 and S14 which are driven by the inverters 211 and 221 are changed from the ground potential Vss to the power potential Vcc. The potential of the node N11 is boosted to the potential of 2Vcc by the capacitor 212 when the latter receives the third pulse signal S13 while the potential of the node N12 is boosted to the potential of 2Vcc by the capacitor 222 when latter receives the fourth pulse signal S14. At this time, when the potential of the node N12 exceeds the potential expressed by Vcc+vtn, the NMOSs 311 and 342 are turned on so that the potentials of the nodes N13 and N14 are charged until it reaches the power potential Vcc. When the potential of the node N11 exceeds the potential expressed by φp+vtp, the PMOS 411 is turned on so that the output node NO is charged until it reaches the output potential φp owing to the accumulated charge of the node N11. At the same time, the node N11 emits the charge and its potential is changed to the potential expressed by φp+vtp. At this time, the node N12 does not use its accumulated charge for charging the output node NO and hence its potential is kept to be 2Vcc. Accordingly, there are obtained the potential difference exceeding the power potential Vcc between gates and sources of the NMOSs 331 and 342 so that the potentials of the nodes N13 and N14 are charged quickly until they reach the power potential Vcc.

Furthermore, it is possible to lessen the capacitance of the capacitor 222 without depending on the charge consumption of the output node NO since the accumulated charge of the node N12 is not used for charging the output node NO. Still furthermore, the inverter 221 for driving the pulse signal S14 which is input to the capacitor 222 is separated from the inverter 211 for driving the pulse signal S13 which is input to the capacitor 212. Accordingly, the potential change of the fourth pulse signal S14 is not slowed by the capacitance of the first capacitor 212. The potential change of the fourth pulse signal S14 is not slowed by the capacitance of the second capacitor 222 since the capacitance of the second capacitor 222 is small. Accordingly, the output potential φp is not lowered.

After time t3, the same operations which are performed during times t1 to t3 are repeated between the first and second pulse signals S11 and S12.

The first embodiment of the present invention has the following effects.

(a) The first and third nodes N11 and N13 for supplying the charge to the output node NO are separated from the second and fourth nodes N12 and N14 for controlling the NMOS 311 and 331 which precharge these first and third nodes N11 and N13. Accordingly, there are obtained high potential difference between the gate and source of the NMOS 311 and 321 whereby the output potential φp of the output node NO can be prevented from being lowered.

(b) The first and third capacitors 212 and 232 for boosting the potentials of the first and third nodes N11 and N13 and the second and fourth capacitors 222 and 242 for boosting the potentials of the second and fourth nodes N12 and N14 are separated from one another and the first and fourth inverters 211, 221, 231 and 241 for driving the first to fourth pulse signals S13, S14, S15 and S16 which are input to the first to fourth capacitors 212, 222, 232 and 242 are separated from one another. Accordingly, the potential charging of the nodes N12 and N14 can be made quickly, and hence the charges accumulated in the first and third capacitors 212 and 232 are not discharged to the power potential Vcc by way of the first and third NMOSs 311 and 331. Accordingly, the output potential φp of the output node NO can be prevented from being lowered.

Figure 5:
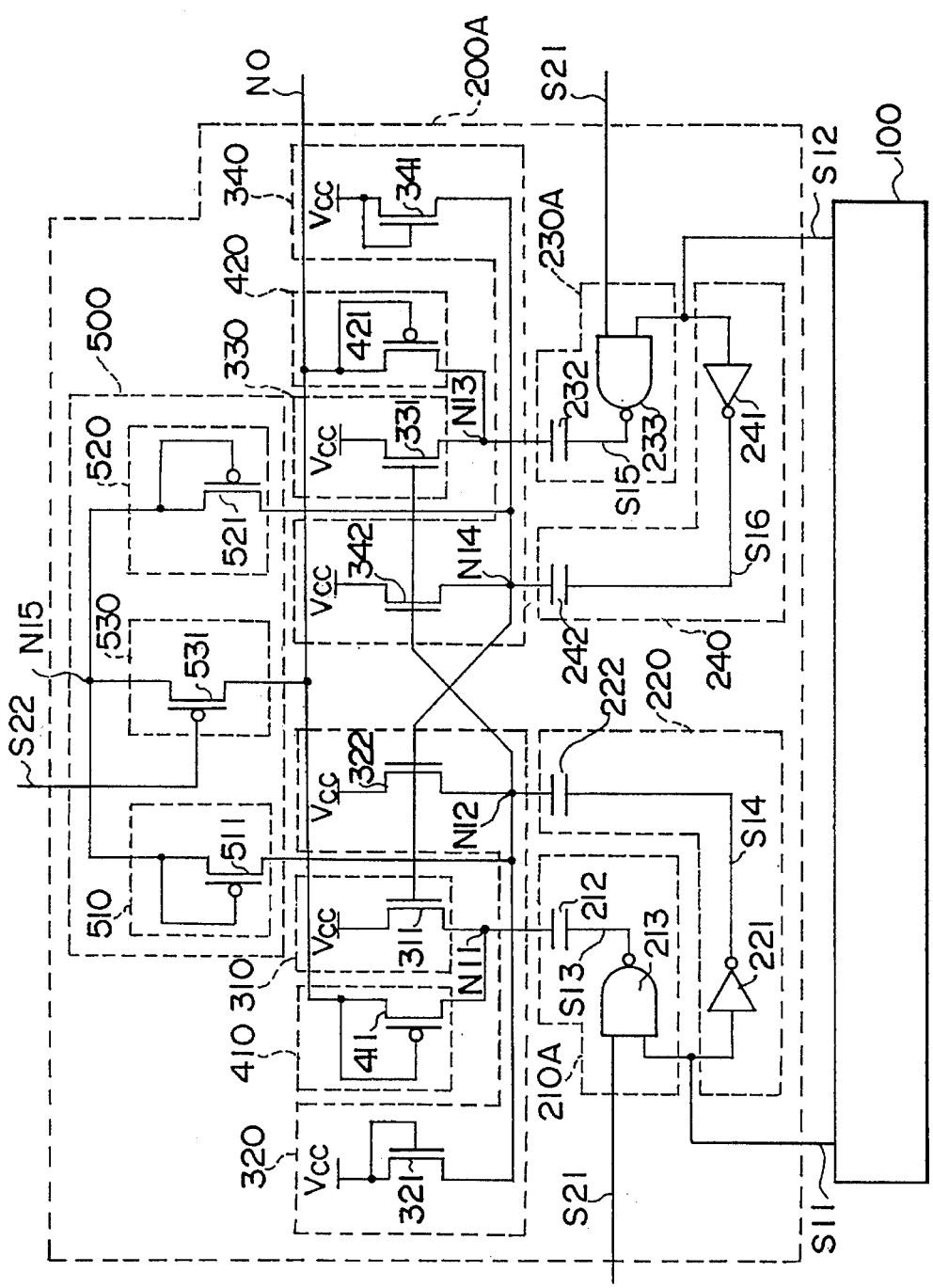
FIG. 5 is a circuit diagram of a booster power generating circuit according to a second embodiment of the invention.

FIG. 5 is a circuit diagram of a booster power generating circuit according to a second embodiment of the invention. The arrangement of the booster power generating circuit of the second embodiment will be described with reference to FIG. 5.

The booster power generating circuit comprises a signal generating circuit 100 arrangement of which is the same as that of the first embodiment and a charge pump circuit 200A arrangement of which is different from that of the first embodiment.

The charge pump circuit 200A comprises first, second, third and fourth booster circuits 210A, 220A, 230A, and 240A, first, second, third and fourth precharge circuits 310, 320, 330 and 340, first and second output circuits 410 and 420 and an auxiliary power circuit 500.

The first and third booster circuits 210A and 230A comprises first and second 2-input NAND gates 213 and 233 which are selectively controlled by a first control signal S21 and first and third capacitors 212 and 232. The first control signal S21 is changed between the power potential Vcc and the ground potential Vss in response to the charge consumption of the load which is connected to, i.e. the output node NO. The NAND gate 213 is connected to the first pulse signal S11 at its one input side and to the control signal S21 at its other input side and it is also connected to the third node N13 by way of the third capacitor 232 at its output side.

The auxiliary power circuit 500 comprises a third output circuit 510 for outputting the boosted potential of the second node N12 to the fifth node N15, a fourth output circuit 520 for outputting the boosted potential of the fourth node N14 to the fifth node N15 and a switching means 530 for outputting the boosted potential of the fifth node N15 to the output node NO. The third output circuit 510 comprises a PMOS 511 for outputting the boosted potential of the second node N12 to the fifth node N15. The PMOS 511 is connected to the second node N12 at its drain and to the fifth node N15 at its source and gate. The fourth output circuit 520 comprises a PMOS 521 for outputting the boosted potential of the fourth node N14 to the fifth node N15 in the same manner as the third output circuit 510. The PMOS 521 is connected to the fourth node N14 at its drain and to the output node NO at its source and gate.

The switching means 530 comprises a PMOS 531 which is subjected to on/off control by the second control signal S22 which is synchronous with the first control signal S21. The second control signal S22 is changed between the potential of the fifth node N15 and the ground potential Vss in response to the charge consumption of the load. The PMOS 531 is connected to the fifth node N15 at its source and to the output node NO at its drain and to the second control signal S22 at its gate.

The operations of the booster power generating circuit will be described respectively (1) in case of large charge consumption of the load, and (2) in case of small charge consumption of the load.

Supposing that the threshold potential of the NMOS in FIG. 5 is vtn and the threshold potential of the PMOS is vtp.

(1) In case of large charge consumption:

In a normal case where the charge consumption of the load connected to the output node NO is large, the control signal S22 is in the potential expressed by 2Vcc−vtp, the control signal S21 is in the power potential Vcc and the fifth node is in the potential expressed by 2Vcc−vtp while the PMOS 531 is turned off and the first and third booster circuits 210A and 230A are active. The operation of the booster power generating circuit in this state is the same as the first embodiment.

Figure 6:
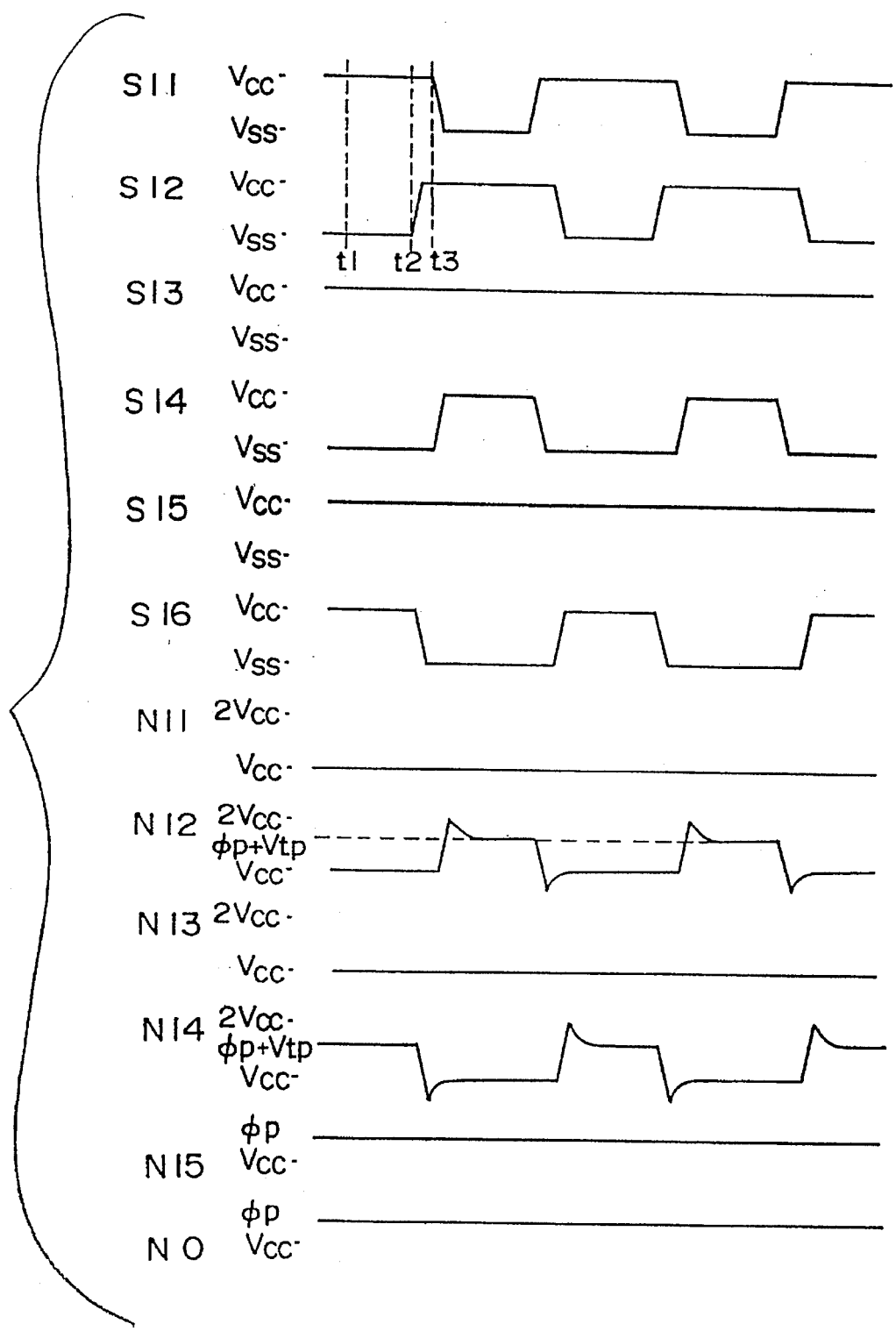
FIG. 6 is a timing chart explaining the operation of the booster power generating circuit in FIG. 5.

(2) In case of small charge consumption:

FIG. 6 is a timing chart explaining the operation of the booster power generating circuit in FIG. 5 at the standby state where the charge consumption of the load is small. The booster power generating circuit according to the second embodiment will be described with reference to FIG. 6.

At time t1, the pulse signals S11 and S16 are in the power potential Vcc and the pulse signals S12 and S14 are in the ground potential Vss while the nodes N11, N12 and N13 are in the power potential Vcc, the node N14 is in the potential expressed by φp+vtp, the node N15 and the output node NO are respectively in the output potential φp.

At the standby state, the control signals S21 and S22 are always in the ground potential Vss. Accordingly, the PMOS 531 is turned on and the NAND gates 213 and 233 are inactive and the pulse signals S13 and S15 are kept in the power potential Vcc.

At time t2, if the second pulse signal S12 is changed from the ground potential Vss to the power potential Vcc, the sixth pulse signal S16 which is driven by the inverters 241 is changed from the power potential Vcc to the ground potential Vss. The potential of the node N14 is changed to the potential expressed by φp+vtp−Vcc by the capacitor 242 when the latter receives the pulse signal S16. At this time, when the potential of the node N14 becomes less than the potential expressed by Vcc−vtn, the NMOSs 341 and 342 are turned on so that the potential of the fourth node N14 is charged until it reaches the potential expressed by Vcc−vtn.

At time t3, if the first pulse signal S11 is changed from the power potential Vcc to the ground potential Vss, the pulse signal S14 which is driven by the inverter 221 is changed from the ground potential Vss to the power potential Vcc. The potential of the node N12 is boosted to the potential of 2Vcc by the capacitor 222 when the latter receives the fourth pulse signal S14. At this time, when the potential of the node N12 exceeds the potential expressed by Vcc+vtn, the NMOS 342 is turned on so that the potential of the node N14 is charged until it reaches the power potential Vcc. When the potential of the node N12 exceeds the potential expressed by φp+vtp, the PMOS 511 is turned on so that the nodes N15 and N16 are charged until they reach the output potential φp owing to the accumulated charge of the node N12. At the same time, the node N12 emits the charge and its potential is changed to the potential expressed by φp+vtp.

At this time, the potential of the node N12 decreases from the potential of 2Vcc, the mutual conductance gm of the NMOS 342 is lowered. However, since the node N12 supplies the charge at the standby state alone, the lowering of the output potential φp owing to the charge consumption is small and the capacitance of the capacitor 222 can be lessened compared with that of the capacitor 212, the node N12 can be charged quickly. Accordingly, the output potential φp is not lowered.

After time t3, the same operations which are performed during times t1 to t3 are repeated between the first and second pulse signals S11 and S12.

The booster power generating circuit according to the second embodiment of the present invention has the same effects as the first embodiment and also has the effect that the current consumption can be reduced since the boosted current is supplied from the capacitors 222 and 242 having small capacitance while the second and third capacitors 212 and 232 having large capacitance are stopped at the standby state.

The present invention is not limited to the first and second embodiments as set forth above but can be modified as follows.

(1) The NMOS and the PMOS of the charge pump circuits 200 and 200A may comprise other transistors and the polarity of the power supply can be changed.

(2) The width of the pulse signal may be varied by increasing or decreasing the number of inverters of the signal generating circuit 100. The signal generating circuit 100 may comprise other circuits.

Figure 7:
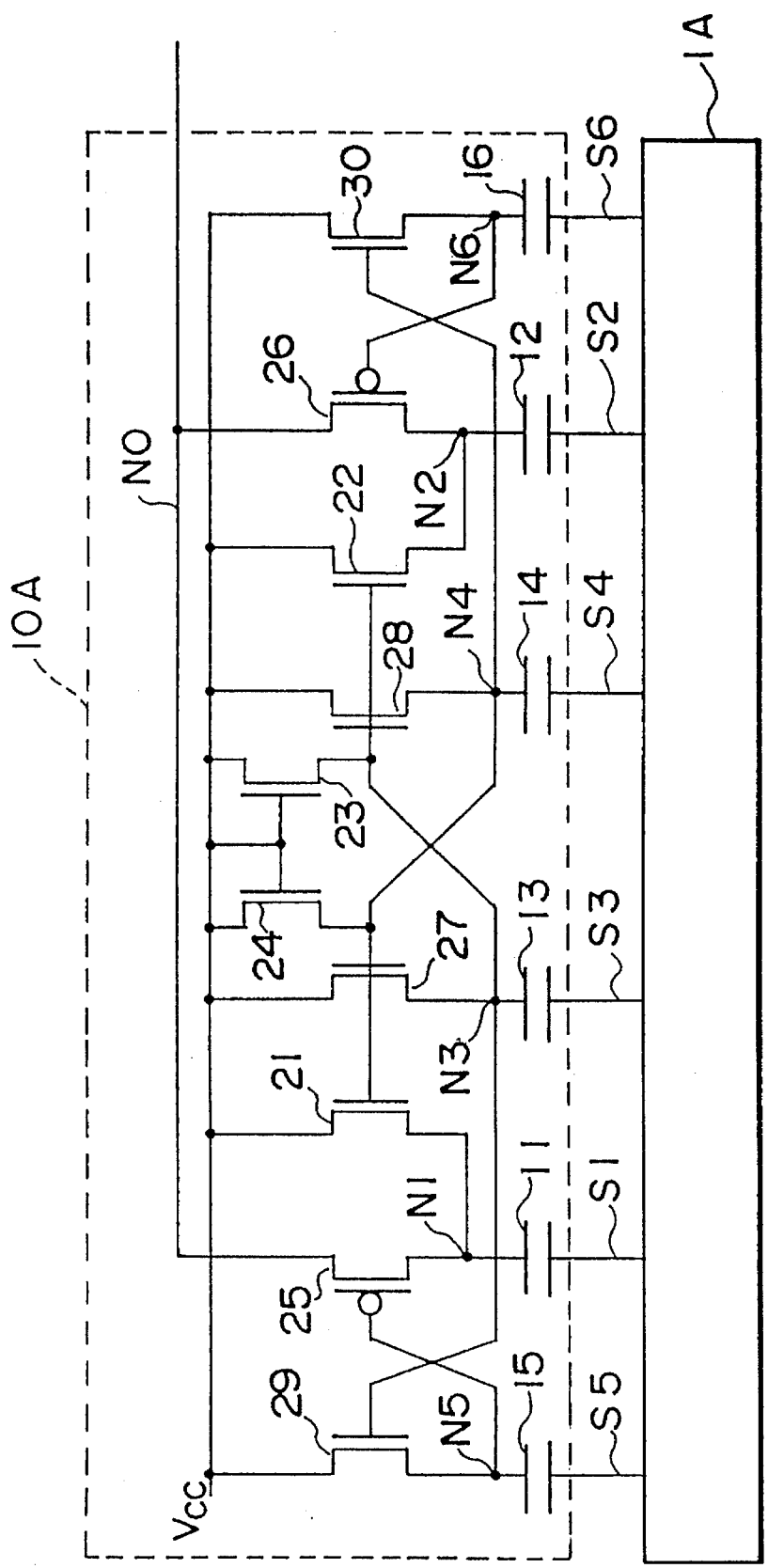
FIG. 7 is a circuit diagram of a booster power generating circuit according to a third embodiment of one invention.

FIG. 7 is a circuit diagram of a booster power generating circuit according to a third embodiment of the invention. The arrangement of the booster power generating circuit of the third embodiment will be described with reference to FIG. 7.

The booster power generating circuit comprises a signal generating circuit 1A composed of a gate circuit, etc. and a charge pump circuit 10A. The signal generating circuit 1A generates first and second pulse signals S1 and S2 which complement each other, third and fourth pulse signals S3 and S4 which complement each other, and fifth and sixth pulse signals S5 and S6 which complement each other wherein the charge pump circuit 10A can output a given booster potential in response to the first and second pulse signals S1 and S2.

There are provided in the charge pump circuit 10A a first capacitor 11 of a first booster circuit for boosting the potential of the first node N1 in response to the first pulse signal S1, a second capacitor 12 of a second booster circuit for boosting the potential of the second node N2 in response to the second pulse signal S2, a third capacitor 13 of a third booster circuit for boosting the potential of the third node N3 in response to the third pulse signal S3, a fourth capacitor 14 of a fourth booster circuit for boosting the potential of the fourth node N4 in response to the fourth pulse signal S4, a fifth capacitor 15 of a fifth booster circuit for boosting the potential of the fifth node N5 in response to the fifth pulse signal S5, and a sixth capacitor 16 of a sixth booster circuit for boosting the potential of the sixth node N6 in response to the sixth pulse signal S6.

In the charge pump circuit 10A, there are provided an NMOS 22 as a first precharge circuit for precharging the second node N2 when controlled by the third node N3, an NMOS 21 as a second precharge circuit for precharging the first node N1 when controlled by the fourth node N4, NMOSs 24 and 28 as a third precharge circuit for precharging the fourth node N4 when controlled by the third node N3, NMOSs 23 and 27 as a fourth precharge circuit for precharging the third node N3 when controlled by the fourth node N4, an NMOS 29 as a fifth precharge circuit for precharging fifth node N5 when controlled by the third node N3 and an NMOS 30 as a sixth precharge circuit for precharging the sixth node N6 when controlled by the fourth node N4. There are additionally provided PMOSs 25 and 26 as first and second output circuits for respectively outputting the boosted potential of each of the first and second nodes N1 and N2 to the output node NO.

The elements of the charge pump circuit 10A are connected with one another in the following manner. That is, the capacitor 11 receives at its one electrode the first pulse signal S1 from the pulse signal generating circuit 1A and it is connected to the first node N1 at its other electrode. The capacitor 12 receives at its one electrode the second pulse signal S2 from the pulse signal generating circuit 1A and it is connected to the second node N2 at its other electrode. The capacitor 13 receives at its one electrode the third pulse signal S3 from the pulse signal generating circuit 1A and it is connected to the third node N3 at its other electrode. The capacitor 14 receives at its one electrode the fourth pulse signal S4 from the pulse signal generating circuit 1A and it is connected to the fourth node N4 at its other electrode. The capacitor 15 receives at its one electrode the fifth pulse signal S5 from the pulse signal generating circuit 1A and it is connected to the fifth node N5 at its other electrode. The capacitor 16 receives at its one electrode the sixth pulse signal S6 from the pulse signal generating circuit 1A and it is connected to the sixth node N6 at its other electrode.

The first node N1 is connected to the source of the NMOS 21 and the drain of the PMOS 25 while the second node N2 is connected to the source of the NMOS 22 and the drain of the PMOS 26. The third node N3 is connected to the source of the NMOS 23 and the source of the NMOS 27 and the gate of the NMOS 29 while the fourth node N4 is connected to the source of the NMOS 24, the source of the NMOS 28 and the gate of the NMOS 30. The fifth node N5 is connected to the source of the NMOS 29 and the gate of the PMOS 25 while the sixth node N6 is connected to the source of the NMOS 30 and the gate of the PMOS 26. Each of the drains of the NMOSs 21, 22, 23, 24, 27, 28, 29 and 30 is connected to the power potential Vcc in which the gates of the NMOSs 23 and 24 are respectively connected to the power potential Vcc. The sources of the PMOSs 25 and 26 are connected to the output node NO.

Figure 8:
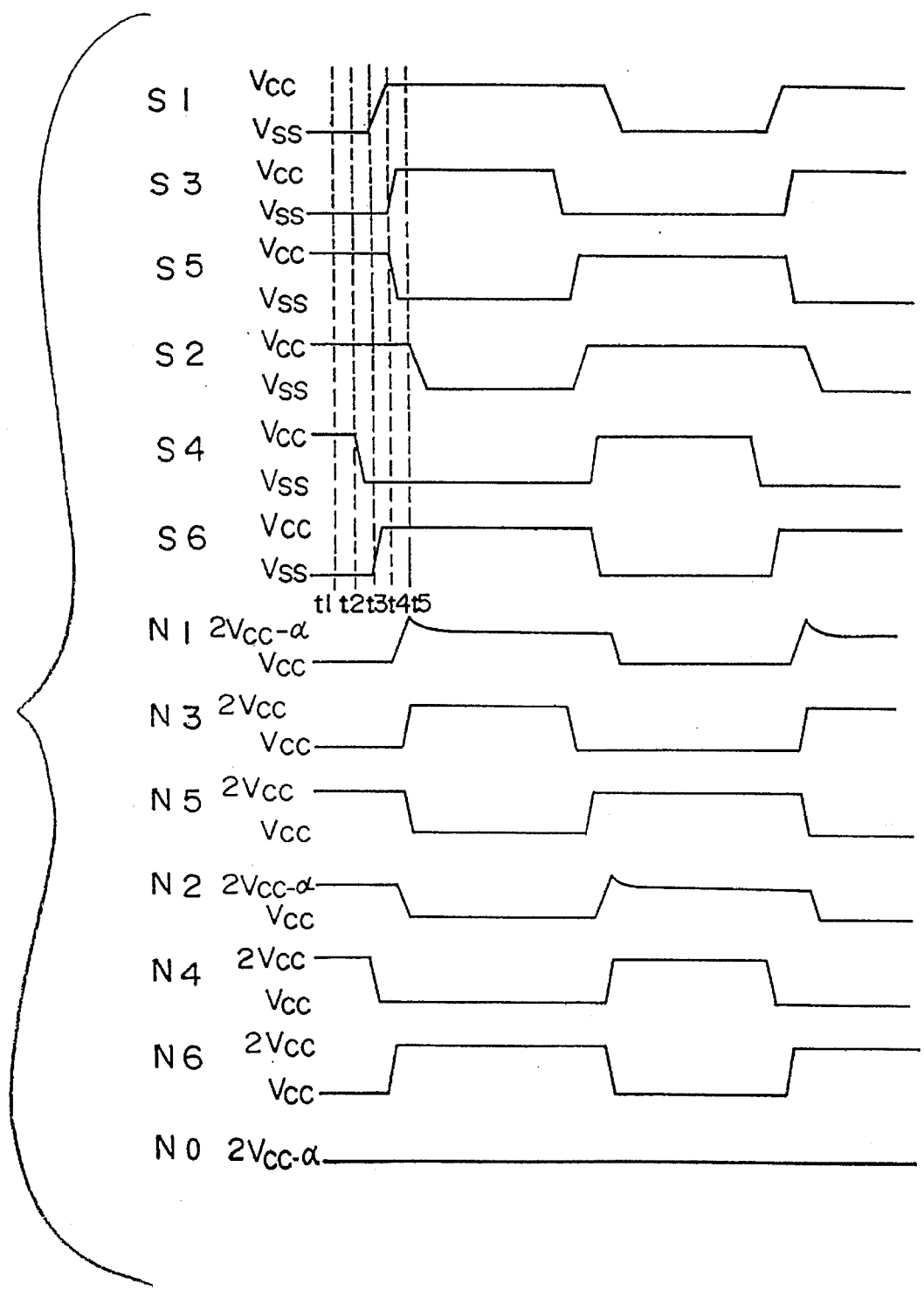
FIG. 8 is a timing chart explaining the operation of the booster power generating circuit in FIG. 7.

FIG. 8 is a timing chart explaining the operation of the booster power generating circuit according to the third embodiment of the invention shown in FIG. 7.

Each potential level of the first to sixth pulse signals S1 to S6 are shown in FIG. 8. $\alpha$ in FIG. 8 represents the potential which depends on the charge consumption of a load circuit, not shown.

Supposing that in the booster power generating circuit each threshold potential of the NMOSs 21, 22, 23, 24, 27, 28, 29 and 30 is vtn and each threshold potential of the PMOSs 25 and 26 is vtp.

At time t1, the first pulse signal S1 is in the ground potential Vss and the second pulse signal S2 is in the power potential Vcc and the third pulse signal S3 is in the ground potential Vss while the fourth pulse signal S4 is in the power potential Vcc and the fifth pulse signal S5 is in the power potential Vcc and the sixth pulse signal S6 is in the ground potential Vss. The first node N1 is in the power potential Vcc and the second and output nodes N2 and NO are respectively in the potential represented as $2Vcc-\alpha$ while the third node N3 is in the potential of Vcc and the fourth and fifth nodes N4 and N5 are respectively in the potential of 2Vcc and the sixth node N6 is in the power potential Vcc.

At time t2, if the fourth pulse signal S4 is changed from the power potential Vcc to the ground potential Vss, the fourth capacitor 14 permits the potential of the fourth node N4 to be in the power potential Vcc. At this time, if potential of the fourth node N4 becomes less than the potential expressed by Vcc+vtn, the NMOSs 21 and 30 are respectively turned off so that the first, third and sixth nodes N1, N3 and N6 are separated respectively from the power potential Vcc.

At time t3, if the sixth pulse signal S6 is changed from the ground potential Vss to the power potential Vcc, the sixth capacitor 16 permits the sixth node N6 to be in the potential of 2Vcc. At this time, if the potential of the node N6 is changed to the potential expressed by $2Vcc-\alpha-vtp$, the NMOS 26 is turned off whereby the second node N2 and the output node NO are separated from each other. If the potential of the first pulse signal S1 is changed from the ground potential Vss to the power potential Vcc, the first capacitor 11 permits the first node N1 to be in the potential of 2Vcc.

At time t4, if the fifth pulse signal S5 is changed from the ground potential Vss to the power potential Vcc, the fifth capacitor 15 permits the fifth node N5 to be in the potential of 2Vcc. At this time, if the potential of the node N5 becomes less than the potential expressed by $2Vcc-\alpha-vtp$, the NMOS 25 is turned on to thereby charge the potential of the output node NO until the latter reaches the potential expressed by $2Vcc-\alpha$ using the charge accumulated in the node N1. At the same time, the potential of the first node N1 is changed to the potential expressed by $2Vcc-\alpha$ while discharging the charge. If the potential of the third pulse signal S3 is changed from the ground potential Vss to the power potential Vcc, the third capacitor 13 permits the third node N3 to be in the potential of 2Vcc. At this time, if the potential of the third node N3 exceeds the potential expressed by Vcc+vtn, the PMOS 22 is turned on so that the potential of the second node N2 is discharged until it reaches the power potential Vcc.

At time t5, if the second pulse signal S2 is changed from the power potential Vcc to the ground potential Vss, the potential of the second node N2 is kept charged in the power potential Vcc although the second capacitor 12 intends to discharge the potential of the second node N2 to be in the power potential Vcc since the NMOS 22 is turned on.

After time t5, the charge pump circuit 10A repeats the operations which are performed during times t1 to t5 in response to the first, third and fifth pulse signals S1, S3 and S5 and the second, fourth and sixth pulse signals S2, S4 and S6 which complement first, third and fifth pulse signals S1, S3 and S5 so that the booster potential expressed by $2Vcc-\alpha$ is generated in the output node NO.

As mentioned above, according to the third embodiment of the invention, there is obtained a high output potential compared with the conventional booster power voltage since there is not generated loss in the output potential by the threshold potential of vtp of the PMOS 25 and the PMOS 26. Furthermore, it is possible to supply more charge by the potential expressed by vtp (C11+C12) supposing that the capacitances of the first and second capacitors 11 and 12 are respectively C11 and C12 when using the same output potential as that of the conventional booster power generating circuit.

The third embodiment is not limited to that as mentioned above but it can be modified as follows.

Even if the PMOSs 25 and 26 serving as the output circuits may comprise transfer gates, the transfer gates can perform the effect of the third embodiment. The first to sixth precharge circuits may comprise resistors having high resistance.

INDUSTRIAL UTILIZATION

According to the first aspect of the invention, there is obtained high potential between the first and third precharge circuits since there is no voltage drop of the boosted potential of the second and fourth nodes, and the precharging speed of the first and third node is not slowed, thereby outputting a given booster potential.

According to the second aspect of the invention, the potentials of the first and third nodes are not output to the power supply side by way of the first and third precharge circuits since the potential change of the second and fourth nodes can be performed quickly, thereby outputting a given booster potential.

According to the third aspect of the invention, it is possible to supply the boosted potential of the first and second nodes to the third node without generating loss of the potential by the threshold potential of the transistors constituting the output circuit.

According to the fourth aspect of the invention, it is possible to reduce the current consumption of the circuit since the booster potential is supplied from the second and fourth booster circuits having small capacitance while stopping first and third booster circuits having large capacitance in case of small current consumption of the load. It is also possible to output a given booster potential even if the current consumption of the load is large.

We claim:

1. A booster power generating circuit comprising:

a first booster circuit for supplying a first booster potential to a first node in response to a first pulse signal;

a second booster circuit for supplying a second booster potential to a second node in response to a second pulse signal;

a third booster circuit for supplying a third booster potential to a third node in response to a third pulse signal;

a fourth booster circuit for supplying a fourth booster potential to a fourth node in response to a fourth pulse signal;

a first precharge circuit for precharging said first node upon reception of said fourth booster potential from said fourth node;

a second precharge circuit for precharging said third node upon reception of said second booster potential from said second node;

a first output circuit for outputting said second and fourth booster potentials of said second and fourth nodes; and a second output circuit for outputting said first and third booster potentials of said first and third nodes.

2. A booster power generating circuit according to claim 1, wherein said first booster circuit includes a first driving circuit which is controlled by a first control pulse signal.

3. A booster power generating circuit according to claim 1, wherein said first output circuit is controlled by a first control pulse signal.

4. A booster power generating circuit according to claim 1, further comprising a third precharge circuit for precharging said second node.

5. A booster power generating circuit according to claim 1, further comprising a third precharge circuit for precharging said fourth node.

* * * * *